Nov. 18, 1941.  J. F. LEVENTHAL  2,262,808
MOTION PICTURE APPARATUS
Filed Dec. 7, 1940
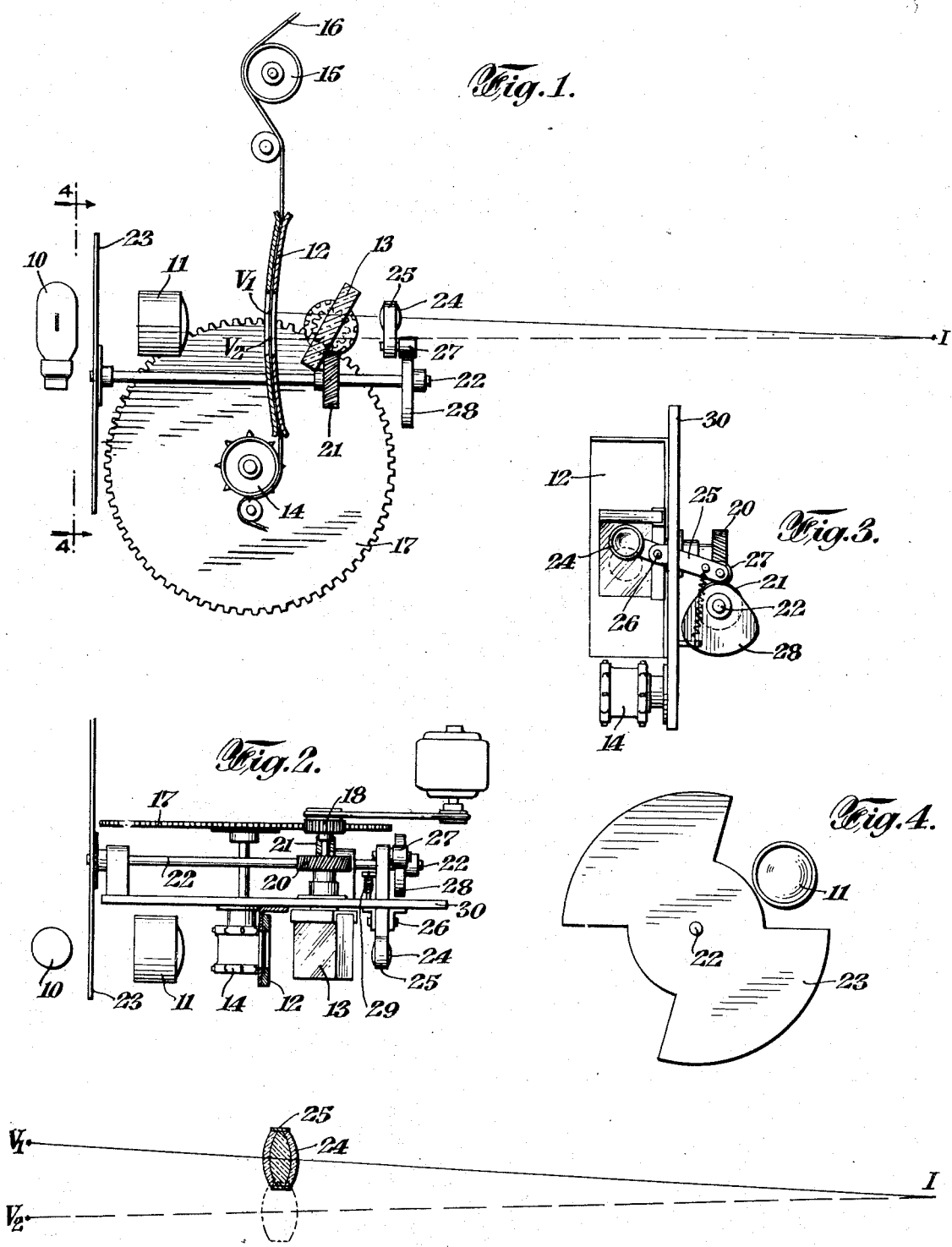
INVENTOR
Jacob F. Leventhal
BY Kenyon & Kenyon
ATTORNEYS.

Patented Nov. 18, 1941

2,262,808

UNITED STATES PATENT OFFICE 2,262,808

MOTION PICTURE APPARATUS

Jacob F. Leventhal, New York, N. Y., assignor to Leventhal Patents, Inc., New York, N. Y., a corporation of Delaware Application December 7, 1940, Serial No. 368,996

3 Claims. (Cl. 88—16.8)

This invention relates to motion picture apparatus and more especially to projectors in which the film moves uninterruptedly across the optical axis and the screen images are rendered stationary by optical compensation.

As illustrated in Leventhal Patent No. 2,067,771, the optical compensator may consist of a single plane-parallel plate of glass which is rotated between the film and lens in timed relation with the linear movement of the film. The plate may have such thickness and refractive index that a complete rotation of the plate during a picture cycle will produce of a single picture frame crossing the optical axis two successive stationary spaced virtual images separated in time from each other by periods of undesired effect which must be shuttered off. A plurality of thicker plane-parallel plates may be used to the same effect as shown in Leventhal Patents Nos. 1,974,573 and 2,085,594.

Since two spaced virtual images are produced, which are re-imaged at a screen plane, means must be provided for bringing the real images into register at the screen plane. In the devices illustrated in Leventhal Patents 1,974,573 and 2,067,771, registration of the real images is effected by the use of two objective lenses which are alternately covered and uncovered in timed relation with the production of the spaced virtual images so that the correct lens may be used for each image. A severe practical limitation resides in the fact that since the diameter of a lens is normally considerably greater than the spacing between the virtual images, only a partial lens may be used during each stage and this results in a material reduction in illumination.

In the device illustrated in Leventhal Patent No. 2,085,594, registration of the real images is effected by the use of a single lens and two reflectors interceptive of the light beam from the lens, each reflector when active being placed at such angle as to direct the axis of the picture to its proper point of registration at the screen plane. The arrangement shown in such patent has two different kinds of disadvantage. First, if the two mirrors are stationary, each can transmit only half the available light from the lens since both are in the beam and one must be shuttered off while the other is effective. Second, if one mirror is made rotatable so as to intercept the whole beam, a difficult mechanical problem presents itself with respect to the rotation of the mirror. While it is not impossible to insure that the reflector will revolve in its true plane without deviation, it is nearly so from a practical standpoint.

An object of the present invention is a projector of the general character above described equipped to effect registration of the real images on the screen solely by the use of a single objective lens.

According to the present invention, a projector of the type above described is provided with a re-imaging lens mounted for movement between two positions and means are provided for moving said lens between its two positions in timed relation with the refracting means and maintaining the lens in each position during one compensation stage. Preferably, the lens is carried by a pivoted arm which is rocked to and fro through the medium of a cam rotated at the same speed as the shutter. However, it is to be understood that the invention contemplates other forms of mechanism for effecting the desired movement of the reimaging lens.

Other objects, novel features and advantages of this invention will become apparent from the following specification and accompanying drawing, wherein:

Fig. 1 is a diagrammatic elevation of a projector embodying the invention;

Fig. 2 is a diagrammatic plan view;

Fig. 3 is a diagrammatic end view;

Fig. 4 is a diagrammatic section on the line 4—4 of Fig. 1, and

Fig. 5 is a schematic view.

In the apparatus illustrated in the drawing, 10 is a light source and 11 is a condenser lens associated therewith to direct light from the source 10 through the film gate 12. An optical compensator 13 consisting of a single glass plate is rotatably mounted just beyond the film gate. An eight picture sprocket 14 co-operates with a retaining roller 15 to draw the film 16 past the gate 12. A gear 17 is fixed to the sprocket wheel 14 and a gear 18 meshing with the gear 17 is fixed to the compensator 13. The gears are in the ratio of eight to one and a single picture frame crosses the optical axis for each complete revolution of the compensator 13, thereby forming two successive spaced virtual images, $V_1$ and $V_2$ in the manner fully explained in Leventhal Patent No. 2,067,771. To the compensator shaft is attached a spiral gear 20 which meshes with a spiral gear 21 carried by the shaft 22 extending at right angles to the compensator shaft, the spiral gears 20 and 21 having a one to one ratio. On the shaft 22 is provided a shutter 23 arranged to intercept the light beam twice for each complete revolution of the compensator.

An objective lens 24 is provided for producing real images of the virtual images $V_1$ and $V_2$. This lens is supported at one end of a lever 25 mounted on a pivot pin 26. The other end of the lever 24 is equipped with a roller 27 which engages a cam 28 mounted on the shutter shaft 22 and a spring 29 maintains the roller 26 in contact with the cam 28. The shape of the cam 28 is such that for each complete revolution it effects one complete to and fro movement of the lever 25 with the lever being temporarily held stationary in each of its extreme positions.

The compensator shaft, shutter shaft and lever 25 are supported by the wall 30 with the sprocket 14, compensator 13 and lens 25 at one side of the wall and with the remaining elements arranged on the opposite side of said wall. The wall 30 is provided with a slot through which the lever 25 extends. Also, the light source 10 and condenser lens 11 are arranged on the same side of the wall 30 as the sprocket 14, compensator 13 and objective lens 24. The shutter 23 is of proper diameter that it is interceptive of the light beam between the light source 10 and the condenser lens 11.

During the first compensating stage, the lens 24 is in the position shown in Fig. 1 and in such position acts to re-image the virtual image $V_1$ on the screen plane and the lens is maintained in this position during the first period for which the shutter 23 is non-interceptive of the beam of light. During the first period for which the shutter 23 is interceptive of the beam of light, the lens is moved into the dotted line position shown in Fig. 3 in which position it is properly arranged to produce a rear image at I of the virtual image $V_2$. The lens is retained in this position during the second period for which the shutter is non-interceptive of the beam of light and during the next period in which the shutter is interceptive of the light beam, the lens is returned to the position shown in Fig. 1 and shown in full lines in Fig. 3, after which the cycle is repeated. The initial position of the lens 24 is shown schematically in Fig. 5 in full lines and the second position of the lens is shown in the same figure in dotted lines. With the arrangement above described, the real images are produced on the screen in registering relation and all the available light from the light source is utilized in the production of each real image.

It is of course understood that various modifications may be made in the apparatus above described, without in any way departing from the spirit of the invention as defined in the appended claims.

I claim:

1. In a device of the character described, means for feeding motion picture film at uniform linear speed, rotatable plane-parallel refracting means arranged and adapted upon rotation in timed relation with the movement of the film to produce two successive stationary spaced virtual images of a luminous point on the moving film means to rotate said refracting means in timed relation with the movement of said film, a lens for producing real images of said spaced virtual images in register at a point in a real image plane, means supporting said lens for movement between two positions, in the first of which the lens center lies on a line joining the first produced virtual image with said point of register and in the second of which the lens center lies on a line joining the second produced virtual image with said point of register, and means actuated in timed relation with said refracting means for moving said lens between said two positions and maintaining said lens in each position for a predetermined period.

2. A motion picture apparatus comprising means for feeding film at uniform linear speed movable optical compensating means, means to effect during movement of the film through a single picture cycle movement of the compensating means through two compensating cycles whereby a point on the moving film is rendered optically conjugate successively with each of two stationary points lying in a common plane and being spaced in the direction of film travel, a lens for producing real images of said virtual images in register at a point in a real image plane, means supporting said lens for movement between two positions, in the first of which the lens center lies on a line joining the first produced virtual image with said point of register and in the second of which the lens center lies on a line joining the second produced virtual image with said point of register, and means actuated in timed relation with said refracting means for moving said lens between said two positions and maintaining said lens in each position for a predetermined period.

3. In a device of the character described, means for feeding motion picture film at uniform linear speed, rotatable plane-parallel refracting means arranged and adapted upon rotation in timed relation with the movement of the film to produce two successive stationary spaced virtual images on a luminous point on the moving film, means to rotate said refracting means in timed relation with the movement of said film, a lens for producing real images of said spaced virtual images in register at a point in a real image plane, a pivoted lever supporting said lens at one end, a rotatable cam engaging the remaining end of said lever, means maintaining said lever in operative engagement with said cam, and means for rotating said cam in timed relation with said refracting means, said cam being of proper shape to maintain said lens in each extreme position for a predetermined period with the lens center lying on a line joining one virtual image with said point of register.

JACOB F. LEVENTHAL.